(12) United States Patent
Dresevic et al.

(10) Patent No.: US 6,498,608 B1
(45) Date of Patent: Dec. 24, 2002

(54) METHOD AND APPARATUS FOR VARIABLE WEIGHT OUTLINE EMBOLDENING OF SCALABLE OUTLINE FONTS

(75) Inventors: Bodin Dresevic, Bellevue; Claude Betrisey, Kirkland, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/211,333

(22) Filed: Dec. 15, 1998

(51) Int. Cl.7 .......................... G06T 11/00; G06T 11/20; G06K 9/36; G06F 17/24
(52) U.S. Cl. ...................... 345/467; 345/469; 345/470; 345/471; 382/242; 707/542
(58) Field of Search ................................. 345/467, 468, 345/469, 470, 471, 441, 442, 144, 419, 420, 427, 443, 421, 426, 428, 469.1; 382/301, 242, 200, 258, 199, 203; 707/518, 519, 542; G06K 9/44

(56) References Cited

U.S. PATENT DOCUMENTS

| | | | | |
|---|---|---|---|---|
| 5,325,479 A | * | 6/1994 | Kaasila | 345/469 |
| 5,410,645 A | * | 4/1995 | Ooka | 345/443 |
| 5,577,177 A | * | 11/1996 | Collins et al. | 345/469 |
| 5,583,949 A | * | 12/1996 | Smith | 382/199 |
| 5,715,473 A | * | 2/1998 | Reed | 395/805 |
| 5,742,295 A | * | 4/1998 | Lindholm | 345/427 |
| 5,790,126 A | * | 8/1998 | Ballard | 345/442 |
| 5,852,680 A | * | 12/1998 | Yoshida | 382/258 |
| 5,898,439 A | * | 4/1999 | Takazawa | 345/441 |
| 5,930,408 A | * | 7/1999 | Seto | 345/469 |
| 5,949,435 A | * | 9/1999 | Brock | 345/468 |
| 5,982,387 A | * | 11/1999 | Hellmann | 345/469 |
| 6,043,826 A | * | 3/2000 | Manning | 345/467 |
| 6,084,586 A | * | 7/2000 | Ooka | 345/419 |

* cited by examiner

*Primary Examiner*—Matthew Luu
*Assistant Examiner*—Wesner Sajous
(74) *Attorney, Agent, or Firm*—Leydig, Voit & Mayer, Ltd (57) ABSTRACT

An emboldened font is simulated from a regular font by moving the outline that describes the font along a vector normal to the direction of the outline a predetermined distance. A new emboldened location is calculated for each control point that defines the font outline. The new location for each control point is determined by calculating a vector perpendicular to the outline at the location of the control point. The control point is then moved a predetermined distance along the perpendicular vector. The predetermined distance controls how much emboldening is applied to the font. The greater the predetermined distance, the more emboldened the font will appear. By moving all of the control points that define a font outline a predetermined distance along a vector perpendicular to the outline, a new outline is created that defines the emboldened version of the font.

10 Claims, 8 Drawing Sheets

ROTATED TEXT PRINTED USING OUTLINE EMBOLDENING

METHOD AND APPARATUS FOR VARIABLE WEIGHT OUTLINE EMBOLDENING OF SCALABLE OUTLINE FONTS

TECHNICAL FIELD

The present invention relates to computer fonts. More specifically, the present invention relates to emboldening computer fonts and, even more particularly described, this invention relates to emboldening scalable outline computer fonts.

BACKGROUND OF THE INVENTION

Fonts used in traditional lead-based typography and modern computer typography are usually organized into font families. Font families are groups of font faces that are similar in appearance, but which have one or several characteristics that vary from one font to another within the family. For instance, 'Arial' is a well-known font family that consists of four font faces known as Arial Regular, Arial Italic, Arial Bold, and Arial Bold Italic. All of these faces are similar in appearance, but vary from one another to the extent that they are italicized, emboldened, or both.

To produce high quality printed fonts, each glyph in each face of a font family must be individually designed. For instance, each glyph in the Arial Regular, Arial Italic, Arial Bold and Arial Bold Italic faces must be designed individually to ensure high print and display quality. This process of individually designing each glyph is very time consuming and expensive. This is especially true for Far East fonts, which may contain thousands, or even tens of thousands of glyphs.

To eliminate the burden of designing individual font faces, fonts may be simulated from the regular face. For instance, an italic face can be simulated from the regular face by applying a small "skewing" transformation to the outline of the font. Methods also exist for simulating an emboldened font from a regular font, however, all of the current methods for simulating an emboldened font suffer from serious disadvantages.

Current methods for simulating emboldened fonts utilize a rendered bitmap of the font to generate the simulated bold font, as opposed to the font outline. For instance, a bold face font may be simulated by rendering a bitmap image of the font in its regular face, offsetting the glyphs in the horizontal and/or vertical directions, and then rendering the bitmap of the regular face again in the new location. That is, the regular glyph is drawn, shifted several picture elements (pixels) horizontally and/or vertically, and another regular glyph is drawn. In this manner, the bitmap is "smeared" several pixels in each direction which causes the font to appear to be emboldened.

Although, current methods for simulating emboldened fonts such as the one described above create satisfactory bold face fonts, they suffer from a number of serious drawbacks. The most serious of these problems is the result of the difference in screen resolution, typically around 75 pixels/inch, and printer resolution, which is typically 300–600 pixels/inch. Because printer resolution is much higher than screen resolution, on-screen fonts that are emboldened by shifting the glyph a few pixels in each direction as described above will not appear emboldened when printed. This is especially true when a large font is printed because although several pixels may be noticeable on a low resolution screen display, they are virtually invisible when printed on a high resolution printer. Therefore, current emboldening methods do not permit satisfactory 'what you see is what you get' ("WYSIWYG") printing of simulated emboldened fonts. Other problems with the current methods for simulated emboldening include heavy memory usage when large fonts are used, and the inability to print emboldened fonts in "outline mode" (i.e. by transmitting only glyph outlines to the printer).

Therefore, in light of these problems, there is a need for a method for emboldening a scalable outline font that preserves WYSIWYG printing, that reduces memory usage, and that permits printing of emboldened fonts in "outline mode."

SUMMARY OF THE INVENTION

The present invention solves the problems described above by emboldening the outline that describes a font rather than emboldening the font bitmap. By emboldening the font outline rather than the font bitmap, a number of advantages are achieved. In particular, fonts emboldened using the algorithm of the present invention will be printed exactly as they appear on screen, which is not possible with bitmap emboldening. Moreover, fonts emboldened using the algorithm of the present invention retain hinting, behave well under transformation (i.e. rotation and skewing), and may be printed in "outline mode."

Generally described, the present invention emboldens a glyph by moving the outline that describes the glyph along a vector normal to the direction of the outline by a predetermined distance. This predetermined distance controls how much emboldening will be applied to the glyph. The greater the predetermined distance, the more emboldened the font will appear.

More specifically described, the present invention emboldens a glyph by moving the control points that define the glyph outline. These control points define the font outline and are either on the outline ("on-curve points") or off of the outline ("off-curve points"). By moving all of the control points that define a font outline a predetermined distance along a vector perpendicular to the outline, a new outline is created that is the predetermined distance from the original outline. The new outline provides the emboldened version of the glyph.

The new coordinates for each of the control points that define the glyph outline are calculated by first selecting a current control point. Next, an outer normal vector is computed that is perpendicular to a line segment between the current control point and the previous control point. The outer normal vector is a vector perpendicular to, the tangent to the curve at the location of the current control point. The direction of the outer normal vector is 90 degrees counter clockwise from the direction of the tangent. An outer normal vector is also computed that is perpendicular to a line segment between the current control point and the next control point on the outline.

Once these two outer normal vectors are computed, they are normalized to the unit length of one pixel. The normalized outer normal vectors are then decomposed into their horizontal and vertical components. Next, the horizontal components are multiplied by a horizontal displacement to obtain displaced horizontal components, and the vertical components are multiplied by a vertical displacement to obtain displaced vertical components. The displaced horizontal and vertical components of the normalized outer normal vectors are then added to obtain a previous displacement vector and a next displacement vector.

Once the previous and next displacement vectors have been calculated, the previous control point and the current control point are displaced by the previous displacement vector to obtain a previous displacement point and a first candidate point for the new position of the current control point. Likewise, the next control point and the current control point are displaced by the next displacement vector to obtain a next displacement point and a second candidate point for the new position of the current control point.

The line segment defined by the previous displacement point and the first candidate point is then intersected with the line segment defined by the next displacement point and the second candidate point. The location of the intersection of these two line segments is the new emboldened location for the current control point. A boundary check may be performed to ensure that the new location is within a tolerable distance of the current control point.

This process is repeated for each control point on a glyph outline, and for each outline in a glyph to be emboldened. Once each control point has been moved in this manner, the emboldened glyph has been created and the glyph may be rendered by filling in the outline. Because the glyph outline is emboldened after hinting, and because horizontal and vertical features of the outline are moved by integer amounts, the hinting is preserved by the emboldening process to a maximal possible extent. Because the non-scaling part of the font transform, for instance, rotation and shear, are applied to the glyph outline after emboldening, correct emboldening is assured under non-trivial transforms.

That the present invention improves over the drawbacks of the prior art and accomplishes the objects of the invention will become apparent from the detailed description of the illustrative embodiment to follow.

BRIEF DESCRIPTION OF THE DRAWINGS

FIG. 2, consisting of FIGS. 2A–2D, are diagrams illustrating the control points and curves that define regular and emboldened fonts.

FIG. 7, consisting of FIGS. 7A–7C, are geometrical diagrams illustrating how the location of an emboldened control point is determined from the non-emboldened control point.

FIG. 8, consisting of FIGS. 8A–8C, are geometrical diagrams illustrating how the location of an emboldened control point is determined from the non-emboldened control point.

DETAILED DESCRIPTION

The present invention is directed toward a method and apparatus for emboldening scalable outline fonts. The present invention may be embodied in an application program, or in an operating system program that provides typography services.

In the illustrative embodiment, the method for emboldening a scalable outline font is implemented as a component of an outline font renderer, or rasterizer, customized for outline emboldening. The renderer first selects the glyph that is to be rendered and scales the glyph if necessary. Next, the renderer applies any necessary hinting to the glyph. Hinting may include rounding the emboldening weights to full pixel values. In this manner, the renderer advantageously preserves hinting features applied to the selected glyph.

Once any necessary hinting has been applied to the selected glyph, the renderer determines whether the glyph should be emboldened. The glyph is emboldened by moving all of the control points that define the glyph a predetermined distance along a vector perpendicular to the outline at the location of the control points. In this manner, a new outline is created that is a predetermined distance from the original outline. The new outline is the emboldened version of the glyph.

Once the renderer has emboldened the selected glyph (or, if no emboldening was required) the renderer applies any necessary rotation or sheer to the selected glyph. Because rotation and/or sheer are applied to the glyph after hinting and emboldening, the glyph retains a high degree of quality. After the renderer has applied the rotation and sheer to the glyph, it generates the bitmap for the glyph by "filling in" the font outline.

The new coordinates for each control point that defines the curves of the selected glyph are calculated by first selecting one of the control points on a curve as a current control point. Next, a vector is located that is perpendicular to the curve at the location of the current control point. The current control point is then moved a predetermined distance along the vector. The new location of the current control point is the new emboldened point. The predetermined distance may be advantageously varied to provide different levels of emboldening. The next control point is then selected as the current control point and the above steps are repeated for each control point. In this manner, each control point is moved to a new emboldened position and the entire outline is emboldened.

The emboldened coordinates for the current control point are determined by calculating a first outer normal vector that is perpendicular to the line segment between the current control point and the previous control point. The outer normal vector is a vector that is perpendicular to the tangent to the curve at the location of the current control point. The direction of the outer normal vector is 90° counter-clockwise from the direction of the tangent. Typically, external outlines follow a clockwise rotation, and internal outlines follow a counter-clockwise rotation. A second outer normal vector is also calculated that is perpendicular to the line segment between the current control point and the next control point on the curve.

Once the outer normal vectors have been calculated, they are normalized to the unit length of one pixel and decomposed into their horizontal and vertical components. The horizontal components of the normalized outer normal vectors are then multiplied by a horizontal displacement. Likewise, the vertical components of the normalized outer normal vectors are multiplied by a vertical displacement. By using separate horizontal and vertical displacement multipliers, the amount of emboldening to be applied to a font may be independently and continuously varied to provide multiple levels of emboldening. Moreover, the horizontal and vertical displacements may be defined to provide metric backward compatibility with previous bitmap emboldening algorithms.

Specifically, the value of the horizontal displacement ($D_h$) may be defined as Int(2% EmHeight+1) where EmHeight is the height in pixels of the selected font. Similarly, the value of the vertical displacement ($D_v$) may be defined as Int(2% EmHeight). The horizontal and vertical displacements may be further defined as follows:

$$D_{left} = \text{floor}(D_h/2) \text{ and } D_{right} = D_h - D_{left}$$

$$D_{up} = \text{floor}(D_v/2) \text{ and } D_{down} = D_v - D_{up}$$

Here, $D_v$ and $D_h$ represent the vertical and horizontal displacement, respectively, and the floor function denotes rounding to the closest integer that is smaller than the number being rounded. If the horizontal and vertical displacements are defined in this manner, $D_{right}$ is used as the horizontal displacement when the horizontal component of the outer normal vector is positive, and $D_{left}$ is used when the horizontal component of the outer normal vector is negative. Likewise, $D_{down}$ is used as the vertical displacement when the vertical component of the outer normal vector is negative, and $D_{up}$ is used when the vertical component is positive.

Once the components of the normalized outer normal vectors have been multiplied by the appropriate displacement values, their component parts are added to obtain a previous displacement vector and a next displacement vector. Then, the previous control point and the current control point are translated by the previous displacement vector to obtain a previous displacement point and a first candidate point for the emboldened point. Likewise, the next control point and the current control point are translated by the next displacement vector to obtain a next displacement point and a second candidate point for the emboldened point.

The new emboldened point for the current control point is located by intersecting the line segment defined by the previous displacement point and the first candidate point with the line segment defined by the next displacement point and the second candidate point. The intersection of these two line segments defines the new emboldened location of the current control point.

Once the emboldened point has been located, a boundary check may be performed to determine if the distance between the emboldened point and the current control point is greater than a predetermined distance. The predetermined distance may be set at two times the horizontal displacement. If the emboldened point is greater than the predetermined distance from the current control point, the location of the emboldened point may be adjusted so that the distance becomes equal or less than the predetermined distance away from the current control point.

The above procedure is then repeated for each control point on the outline. By adjusting the locations of the control points in this manner, the vertical stems of the font will increase their stem width by two times the horizontal displacement ($2D_h$), and the horizontal stems will increase by two times the vertical displacement($2D_v$). The width of the other features of the font will vary smoothly between horizontal emboldening (two times the horizontal displacement) and vertical emboldening (two times the vertical displacement) depending on the slope of the tangent to the curve at the control point. In this manner, the entire font will appear emboldened.

Illustrative Operating Environment

Although the illustrative embodiment will be generally described in the context of an operating system running on a personal computer, those skilled in the art will recognize that the present invention may be implemented in conjunction with other program modules for other types of computers. Furthermore, those skilled in the art will recognize that the present invention may be implemented in a stand-alone or in a distributed computing environment. In a distributed computing environment, program modules and fonts may be physically located in different local and remote memory storage devices. Execution of the program modules may occur locally in a stand-alone manner or remotely in a client server manner. Examples of such distributed computing environments include local area networks and the Internet.

The detailed description that follows is represented largely in terms of processes and symbolic representations of operations by conventional computer components, including a processing unit (a processor), memory storage devices, connected display devices, and input devices. Furthermore, these processes and operations may utilize conventional computer components in a heterogeneous distributed computing environment, including remote file servers, compute servers, and memory storage devices. Each of these conventional distributed computing components is accessible by the processor via a communication network.

The processes and operations performed by the computer include the manipulation of signals by a processor and the maintenance of these signals within data structures resident in one or memory storage devices. For the purposes of this discussion, a process is generally conceived to be a sequence of computer-executed steps leading to a desired result. These steps usually require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to representations of these signals as bits, bytes, words, information, elements, symbols, characters, numbers, points, data, entries, objects, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as creating, adding, calculating, comparing, moving, receiving, determining, identifying, populating, loading, executing, etc. are often associated with manual operations performed by a human operator. The operations described herein are machine operations performed in conjunction with various input provided by a human operator or user that interacts with the computer.

In addition, it should be understood that the programs, processes, methods, etc. described herein are not related or limited to any particular computer or apparatus. Rather, various types of general purpose machines may be used with the program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read-only memory.

Referring now to the drawings, in which like numerals represent like elements throughout the several figures, aspects of the present invention and the illustrative operating environment will be described.

Figure 1:
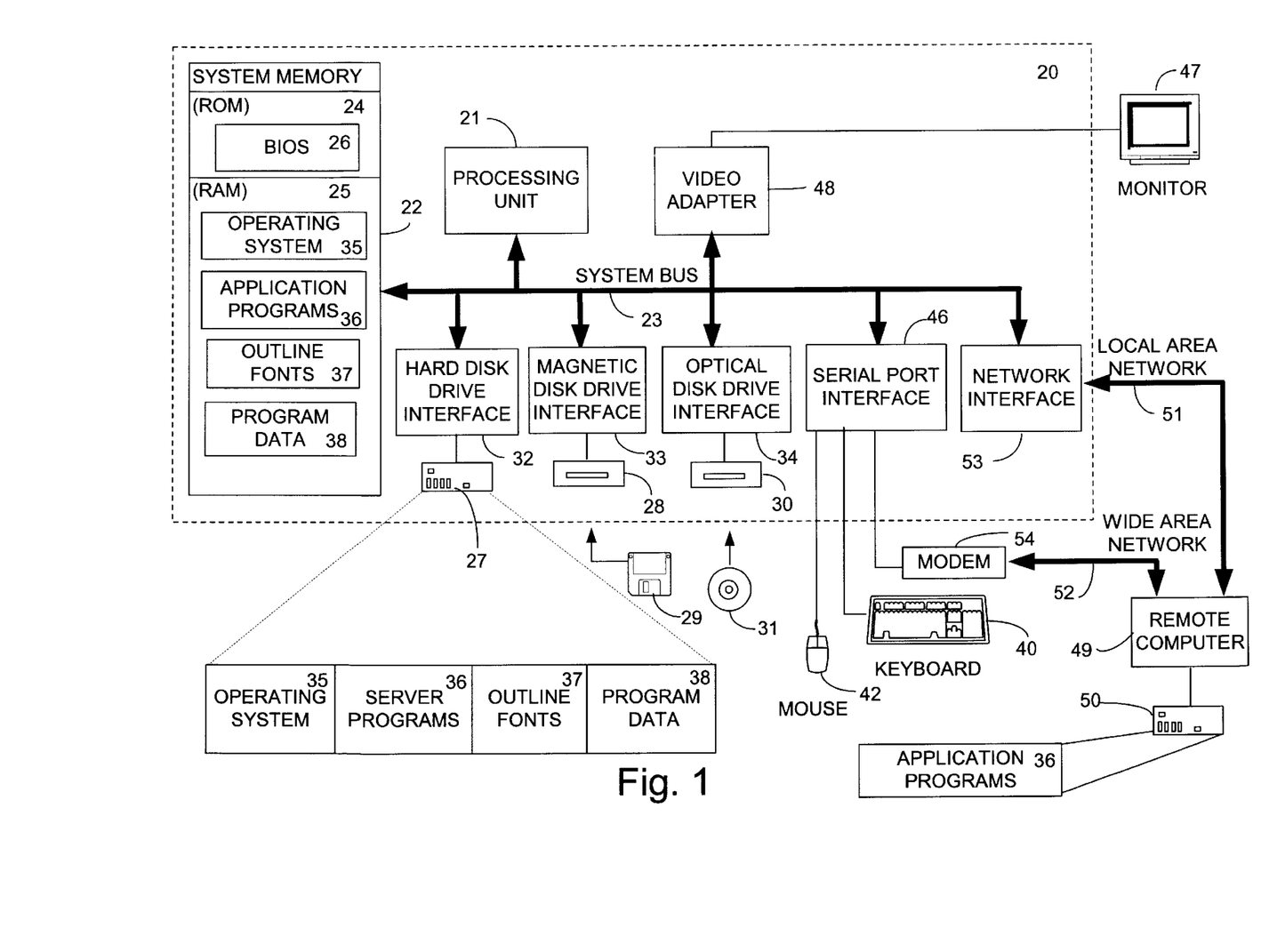
FIG. 1 is a block diagram of a networked personal computer that provides the operating environment for an embodiment of the present invention.

FIG. 1 and the following discussion are intended to provide a brief, general description of a suitable computing environment in which the invention may be implemented. Referring now to FIG. 1, an illustrative system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media are readable by a computer, such as magnetic cassettes, flash memory cards, digital video disks, Bernoulli cartridges, and the like, may also be used in the illustrative operating environment.

A number of program modules may be stored in the drives and RAM 25, including an operating system 35, one or more application programs 36, other program modules 37, and program data 38. Likewise, RAM 25 may also contain outline fonts 37 for use by application programs 36. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are illustrative and other means of establishing a communications link between the computers may be used.

As discussed earlier, the illustrative embodiments of the present invention are embodied in application programs run by an operating system 35, or within the operating system 35 itself. The operating system 35 generally controls the operation of the previously discussed personal computer 20, including input/output operations. In the illustrative operating environment, the invention is used in conjunction with Microsoft Corporation's "WINDOWS 2000" operating system (f/k/a "WINDOWS NT"). However, it should be understood that the invention can be implemented for use in other operating systems, such as Microsoft Corporation's "WINDOWS 3.1," "WINDOWS 95" and "WINDOWS 98" operating systems, IBM Corporation's "OS/2" and "AIX" operating systems, SunSoft's "SOLARIS" operating system used in workstations manufactured by Sun Microsystems, Hewlett-Packard's "HP-UX" and "RT-UX" operating systems, and the operating systems used in "MACINTOSH" computers manufactured by Apple Computer, Inc.

Illustrative Embodiments of the Present Invention

Figure 2A:
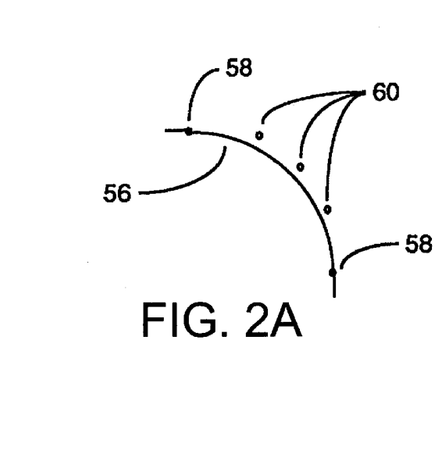
Figure 2B:
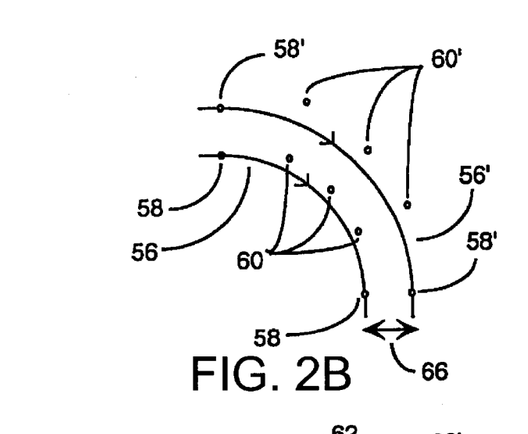
Figure 2C:
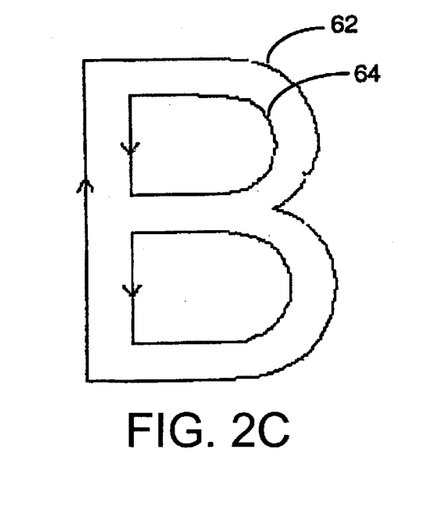
Figure 2D:
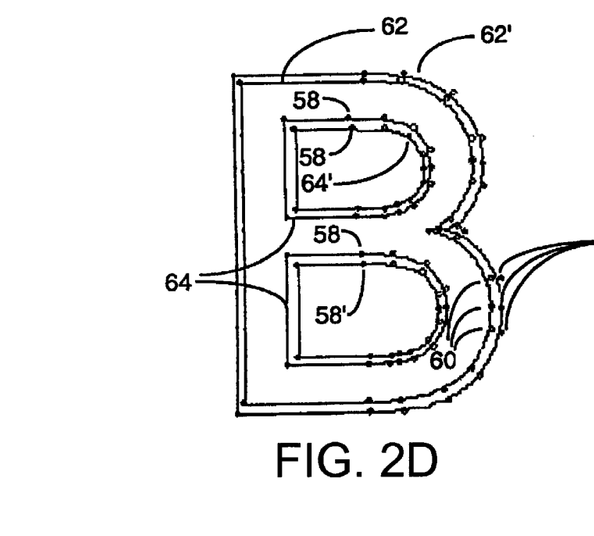
Figure 3:
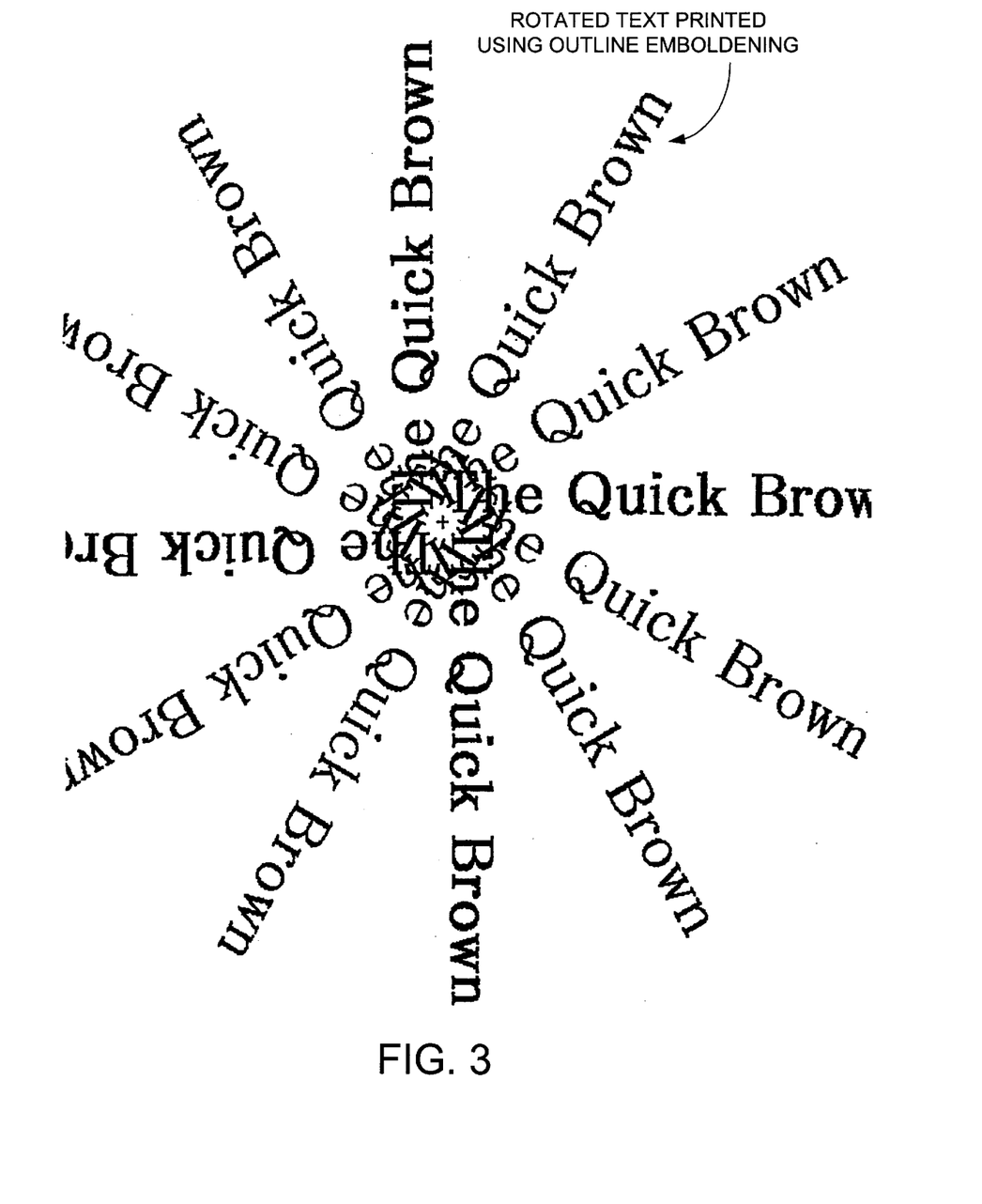
FIG. 3 is a diagram illustrating printed text that has been emboldened using bitmap emboldening.
Figure 4:
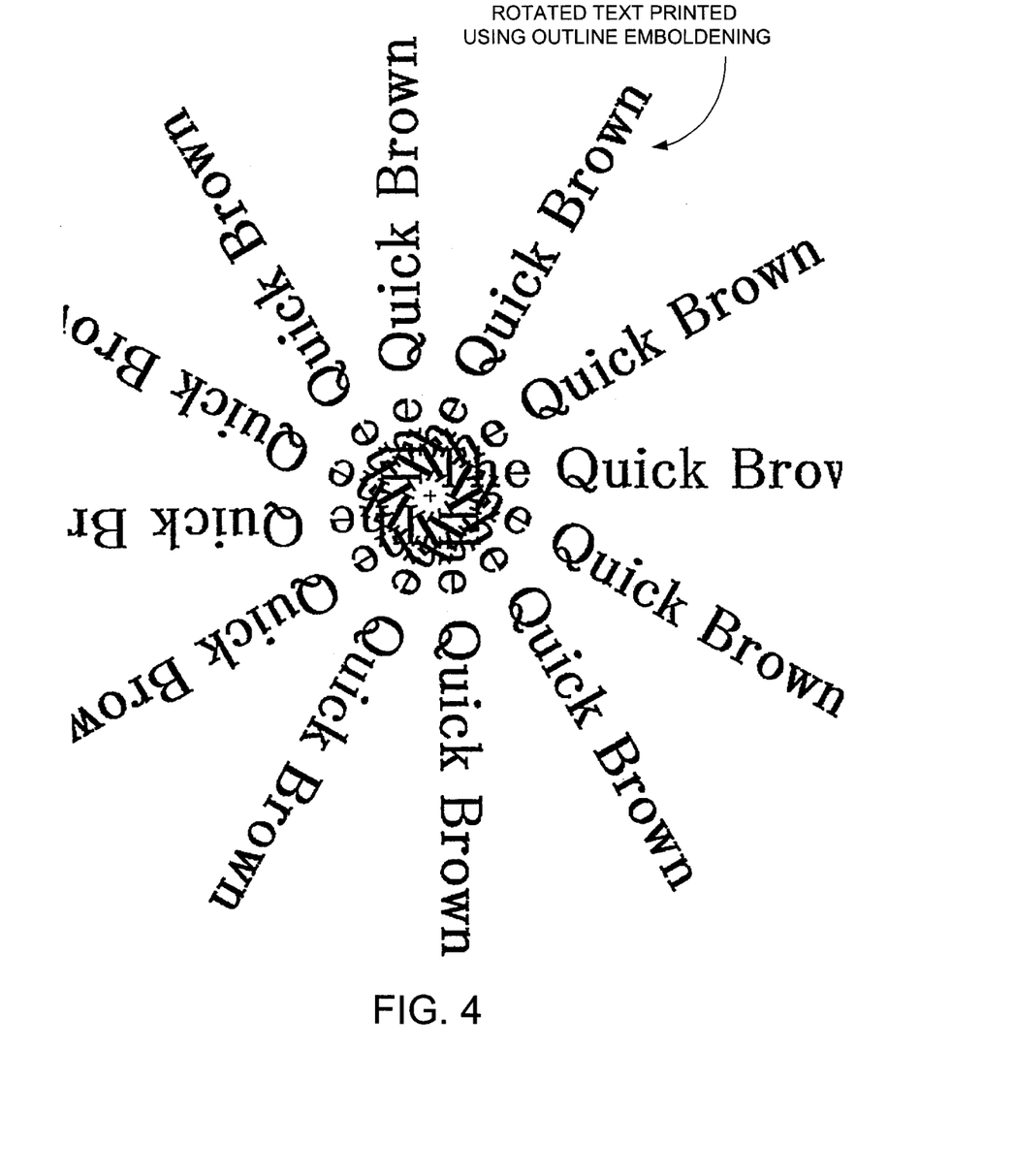
FIG. 4 is a diagram illustrating printed text that has been emboldened using outline emboldening.
Figure 5:
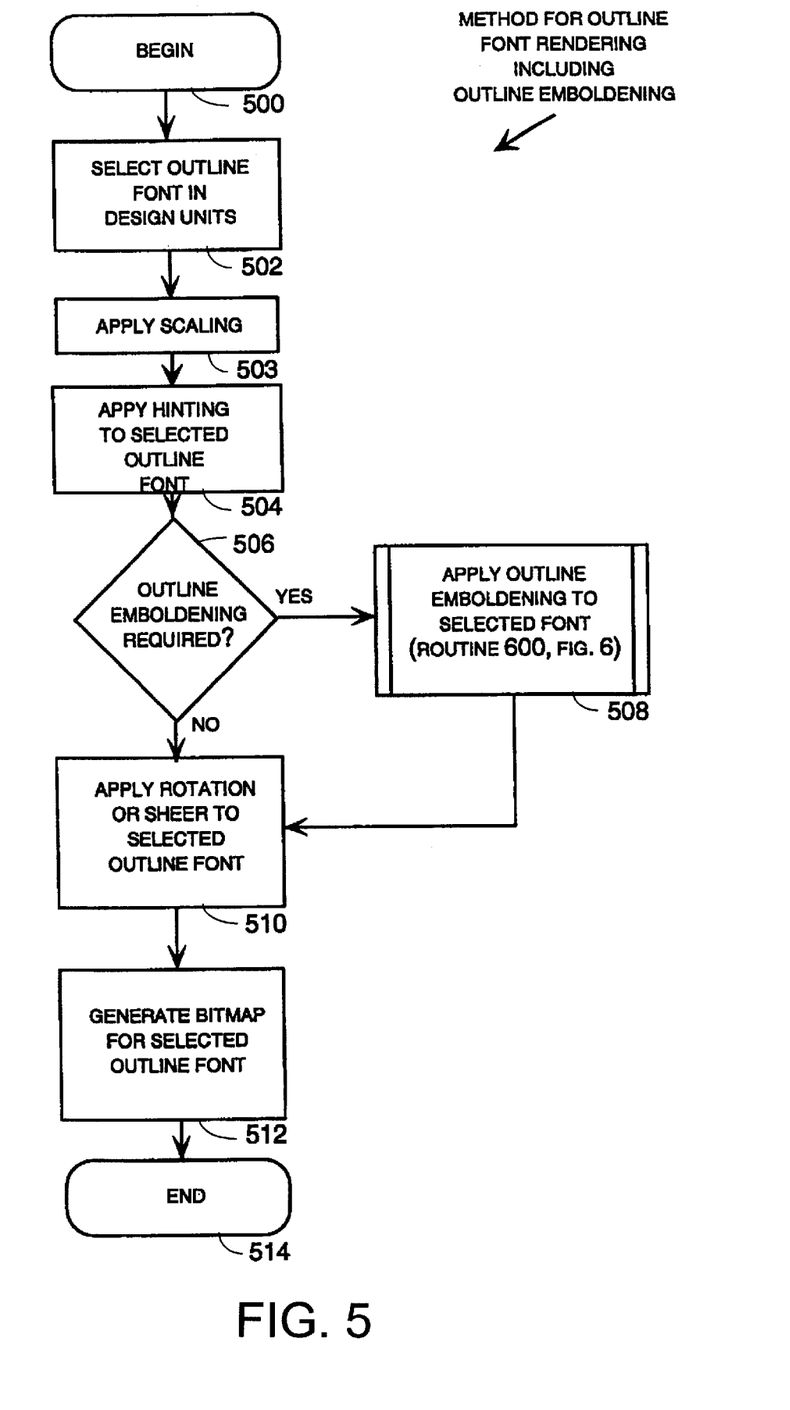
FIG. 5 is a detailed flow diagram illustrating the method steps for rendering an outline font using outline emboldening.
Figure 6:
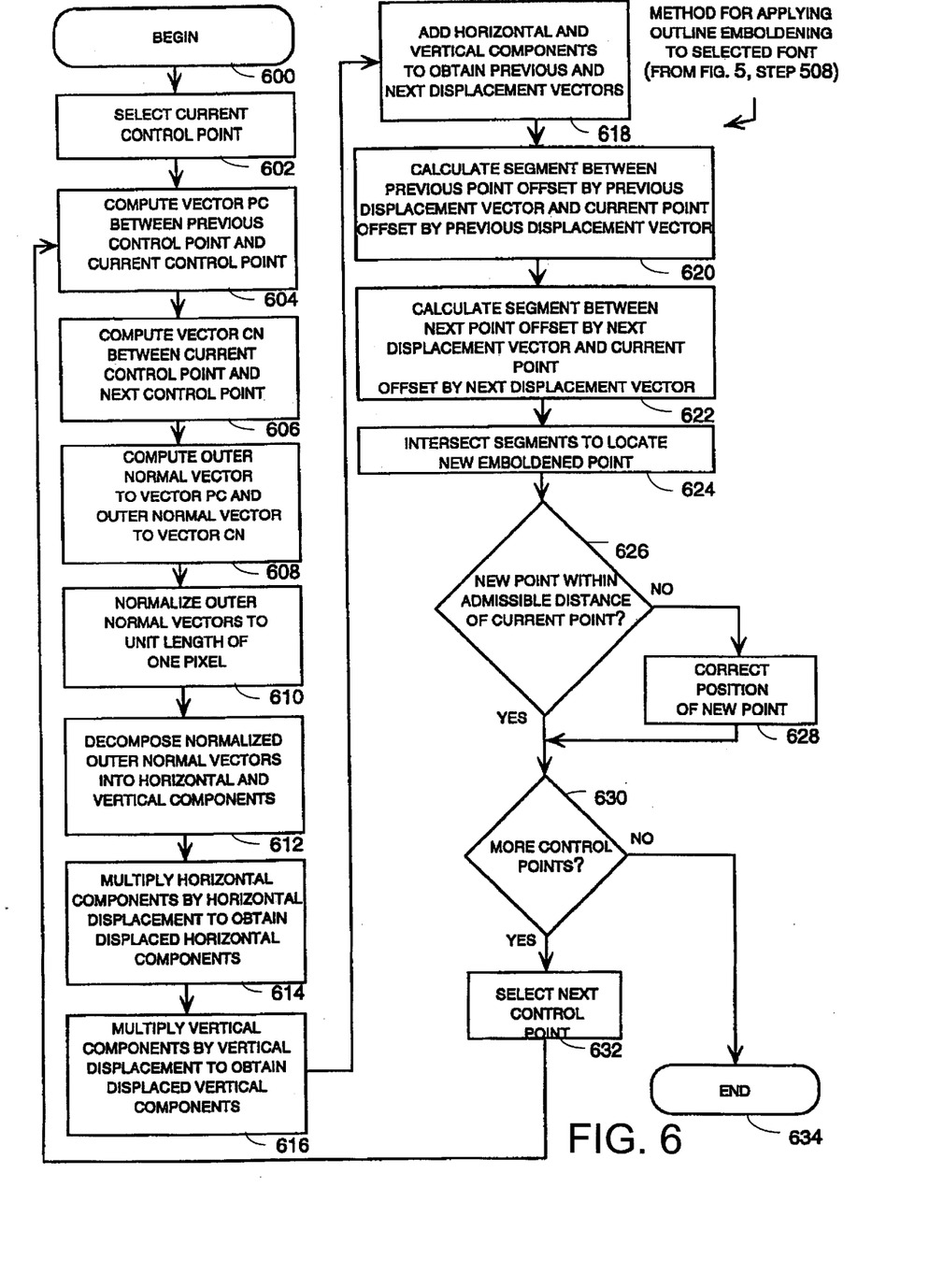
FIG. 6 is a detailed flow diagram illustrating the method steps for applying outline emboldening to a font.

With the above preface on the illustrative operating environment for embodiments of the present invention, the remaining FIGS. 2–8 illustrate aspects of several embodiments of the present invention. In FIG. 2, the control points and outline curves that define regular and emboldened fonts are illustrated. FIG. 3 shows printed text emboldened using bitmap emboldening. FIG. 4 shows printed text emboldened using outline emboldening. In FIG. 5, the steps for rendering an outline font using outline emboldening are shown. FIG. 6 illustrates the steps for applying outline emboldening to a font. FIGS. 7 and 8 illustrate how the coordinates of the emboldened outline control points are determined from the coordinates of the non-emboldened control points.

Referring now to FIG. 2A, an outline curve 56 is shown that is defined by on-curve control points 58 and off-curve control points 60. A typical outline glyph is made up of several of such outline curves that pass through the on-curve control points 58, and that are "pulled" in the direction of the off-curve outline control points 60. By moving all of these control points, a new outline ay be created that is the emboldened version of the glyph. FIG. 2B shows emboldened on-curve control points 58' and emboldened off-curve control points 60'. These emboldened control points 58' and 60' define an emboldened outline curve 56' that is a predetermined distance 66 away from the original curve 56. This predetermined distance may be varied to control the degree of emboldening that is applied to the font.

FIG. 2C shows the curves that define an outlined version of the letter 'B'. This letter is defined by an external outline 62, and an internal outline 64. In general, external outlines, such as external outline 62, define the black space in a glyph, and internal outlines, such as internal outlines 64, define the white space in a glyph. In this manner, glyphs can be created, such as a 'B', that have empty inside spaces. Also, external outlines are considered to follow a clockwise rotation, and internal outlines follow a counterclockwise rotation. The arrows on internal outline 64 and external outline 62 illustrate these directions.

Referring now to FIG. 2D, the outlined letter 'B' and its emboldened counterpart are illustrated. External outline 62 and internal outlines 64 define the outline of the letter 'B' prior to emboldening. Each of the on-curve control points 58 and off-curve control points 60 are moved a predetermined distance away from their original positions. Once they have been moved, emboldened on-curve control points 58' and emboldened off-curve control points 60' define the emboldened outlines for the letter 'B'. An illustrative method for calculating the new location of the control points is discussed below with reference to FIGS. 6–8.

FIGS. 3 and 4 illustrate one of the major advantages of the present invention. FIG. 3 shows printed text that was emboldened using bitmap emboldening. Because the font in which the text appears was emboldened by "smearing" a bitmap of the font, the text appears jagged after rotation. By contrast, the text of FIG. 4 was emboldened using outline emboldening. Because the text of FIG. 4 was emboldened as an outline as described herein, the printed text appears much smoother when rotated than the text illustrated in FIG. 3.

FIG. 5 illustrates a method 500 for rendering an outline font using outline emboldening. At step 502, an outline font is selected. At step 503, the font is scaled to a desired size in device units (e.g. to a desired height of pixels). At step 504, hinting is applied to the selected font, if necessary. At decision step 506, a determination is made as to whether outline emboldening should be applied to the selected font. If outline emboldening is not to be applied to the selected font, the "NO" branch is taken to step 510. If, however, outline emboldening is to be applied to the selected font, the "YES" branch is followed to step 508, where the selected font outline is emboldened. The method 600 for emboldening the outline of the selected font is discussed below with reference to FIG. 6. Once the selected font has been emboldened at step 508, the method 500 continues to step 510.

At step 510, rotation, sheer, and other transformations are applied to the elected outline font, if necessary. From step 510, the method continues to step 512, where the selected outline font is rendered by generating the bitmap for the font. Step 512 continues to step 514, where the method 500 ends.

Figure 7A:
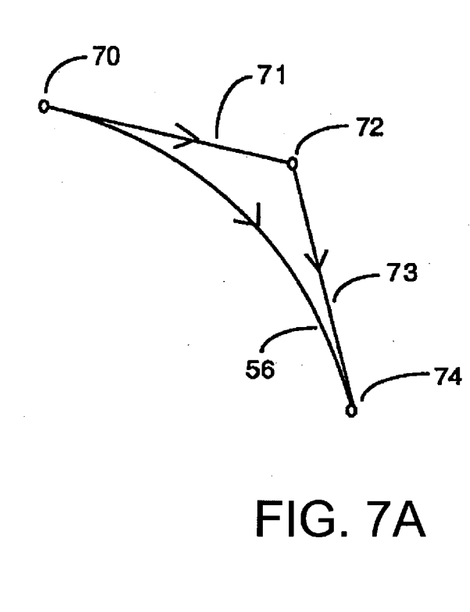
Figure 7B:
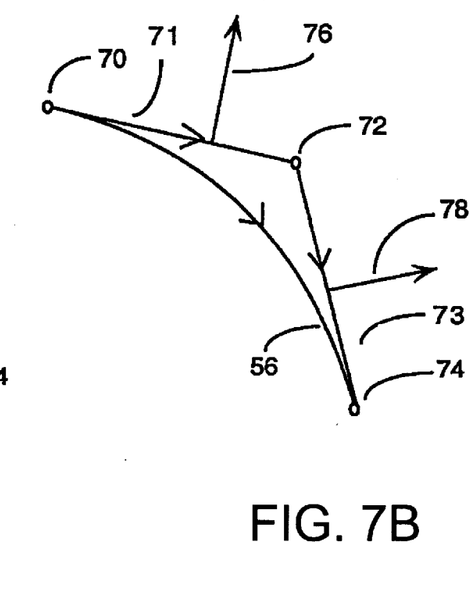
Figure 7C:
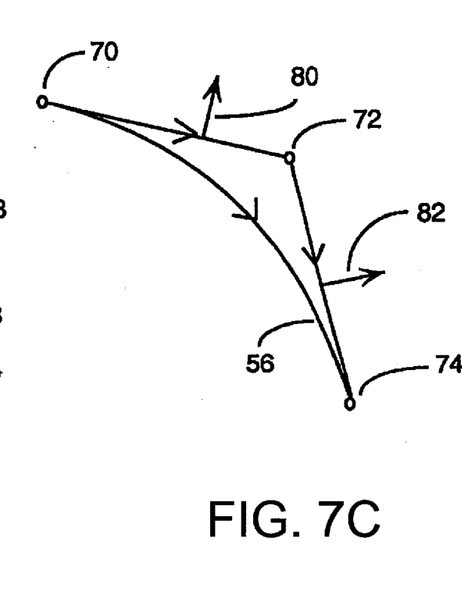
Figure 8A:
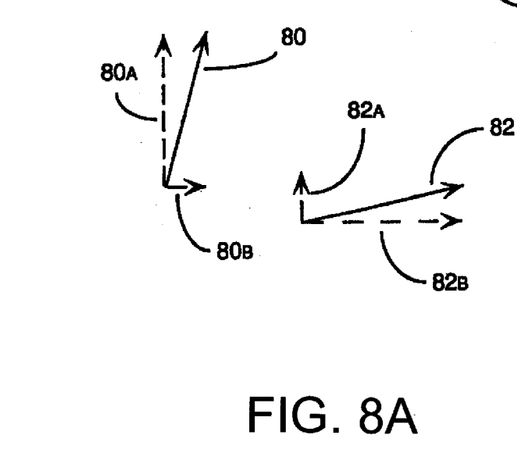
Figures 8B, 8C:
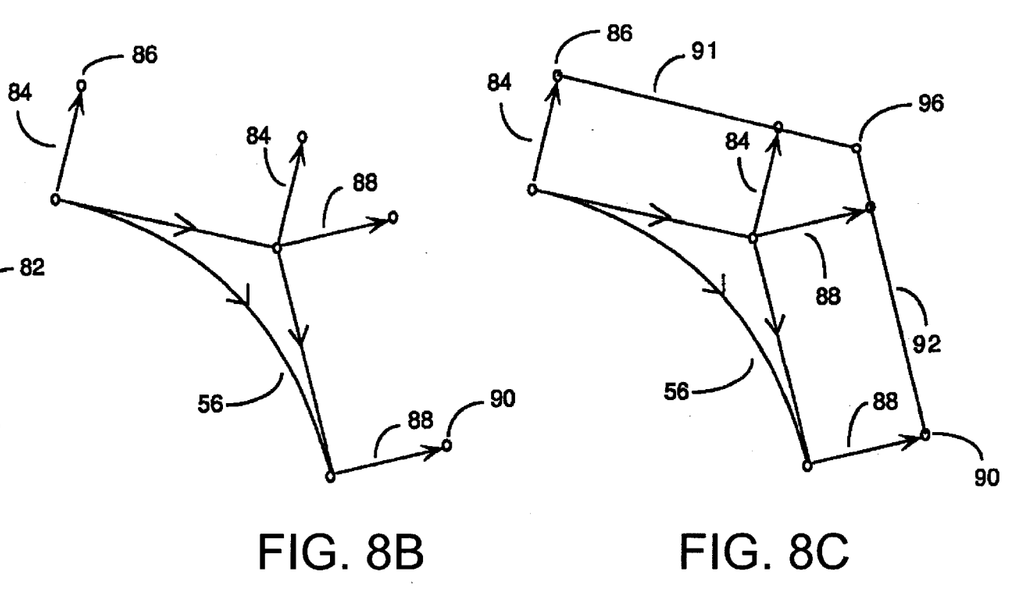

FIG. 6 illustrates a method 600 for applying outline emboldening to the selected outline font. FIG. 6 will be described with reference to FIGS. 7A–7C and 8A–8C. Referring now to FIGS. 6 and 7, the method 600 begins at step 602, where one of the control points that defines the outline 56 to be emboldened is selected as a current control point 72. Step 602 continues to step 604, where the vector 71 between the previous control point 70 on the outline 56 and the current control point 72 is computed. At step 606 the vector 73 between the current control point 72 and the next control point 74 on the outline is computed.

From step 606 the method 600 continues to step 608 where outer normal vectors 76, 78 are calculated for the vector 71 between the current control point 72 and the previous control point 70 and the vector 73 between the current control point 72 and the next control point 74. At step 610, the outer normal vectors are normalized to the unit length of one pixel, giving normalized outer normal vectors 80, 82.

Referring now to FIGS. 6 and 8, the normalized outer normal vectors 80, 82 are decomposed into their horizontal vector components 80b, 82b and vertical vector components 80a, 82a at step 612. From step 612, the method continues to step 614, where the horizontal vector components 80b, 82b of the outer normal vectors 80, 82 are multiplied by a horizontal displacement to obtain displaced horizontal components. Likewise, at step 616, the vertical components 80a, 82a of the outer normal vectors 80, 82 are multiplied by a vertical displacement to obtain displaced vertical components.

From step 616, the method 600 continues to step 618, where the displaced horizontal components of the normalized outer normal vectors 80, 82 are added to the displaced vertical components of the normalized outer normal vectors 80, 82 to obtain a previous displacement vector 84 and a next displacement vector 88. At step 620, the line segment 91 between the previous control point 70 offset by the previous displacement vector 84 and the current control point 72 offset by the previous displacement vector 84 is calculated. Similarly, at step 622, the line segment 92 between the next control point 74 offset by the next displacement vector 88 and the current control point 72 offset by the next displacement vector 88 is calculated.

From step 622, the method continues to step 624, where the two line segments 91, 92 are intersected. The point at which the two line segments intersect is the location of the new emboldened point 96 for the current control point. At step 626, a determination is made as to whether the new emboldened point 96 is within admissible distance of the current control point 72. If the new emboldened point 96 is within admissible distance from the current control point, the method continues to step 630.

If the new emboldened point 96 is not within admissible distance of the current control point 72, the method branches from step 626 to step 628, where the position of the new emboldened point 96 is corrected so that it is within admissible distance of the current control point 72. From step 628, the method continues to step 630, where a determination is made as to whether there are more control points on the outline 56 to be moved. If there are more control points to be moved, the method continues to step 632, where the next control point 74 on the outline is selected as the current control point. From step 632, the method continues to step 604, described above. Referring again to step 630, if no additional control points remain to be emboldened, the method ends at step 634.

In view of the foregoing, it will be appreciated that the present invention provides a system and method for variable weight outline emboldening of scalable fonts. It should be understood that the foregoing relates only to specific embodiments of the present invention, and that numerous changes may be made therein without departing from the spirit and scope of the invention as defined by the following claims.

What is claimed is:

1. A computer-implemented process for emboldening a scalable outline font defined by curves comprising control points, comprising the steps of:

(a) selecting one of the control points on one of the curves as a current control point;

(b) locating a vector perpendicular to the curve passing through the current control point by (1) calculating a first outer normal vector perpendicular to a line segment between the current control point and a previous control point, and calculating a second outer normal vector perpendicular to a line segment between the current control point and a next control point (2) normalizing the first and second outer normal vectors to the unit length of one pixel (3) decomposing the first and second normalized outer normal vectors into horizontal and vertical components (4) multiplying the horizontal components of the first and second normalized outer normal vectors by a horizontal displacement to obtain displaced horizontal components, and multiplying the vertical components of the first and second normalized outer normal vectors by a vertical displacement to obtain displaced vertical components; and (5) adding the displaced horizontal and vertical components of the first normalized outer normal vector to obtain a previous displacement vector and adding the displaced horizontal and vertical components of the second normalized outer normal vector to obtain a next displacement vector;

(c) moving the current control point to a predetermined distance from the curve along the vector to locate an emboldened point for the current control point; and (d) repeating steps (a)–(c) for each of the remaining control points.

2. The computer-implemented process of claim 1 wherein the moving step comprises the steps of:

translating the previous control point by the previous displacement vector to locate a previous displacement point, and displacing the current control point by the previous displacement vector to locate a first candidate point;

translating the next control point by the next displacement vector to locate a next displacement point, and displacing the current control point by the next displacement vector to locate a second candidate point; and intersecting the segment between the previous displacement point and the first candidate point with the segment between the next displacement point and the second candidate point to locate the emboldened point for the current control point.

3. The computer-implemented process of claim 1, further comprising the steps of:

performing a boundary check to determine if the emboldened point is less than a predetermined distance from the current point; and in response to determining that the emboldened point is not less than a predetermined distance from the current point, adjusting the location of the emboldened point so that it is less than the predetermined distance.

4. The computer-implemented process of claim 1, wherein the horizontal displacement is equal to a percentage of the height of the outline font in picture elements plus one, and the vertical displacement is equal to a percentage of the height of the outline font in picture elements.

5. The computer-implemented process of claim 1, further comprising the steps of:

determining whether one of the horizontal components of the first or second outer normal vectors is positive or negative;

in response to determining that one of the horizontal components is negative, setting the horizontal displacement equal to the integer value closest to the horizontal displacement divided by two; and in response to determining that one of the horizontal components is positive, setting the horizontal displacement equal to the horizontal displacement minus the integer value closest to the horizontal displacement divided by two.

6. The computer-implemented process of claim 1, further comprising the steps of:

determining whether one of the vertical components of the first or second outer normal vectors is positive or negative;

in response to determining that one of the vertical components is positive, setting the vertical displacement equal to the integer value closest to the vertical displacement divided by two; and in response to determining that one of the vertical components is negative, setting the vertical displacement equal to the vertical displacement minus the integer value closest to the vertical displacement divided by two.

7. A computer-implemented process for emboldening a scalable outline font, the font defined by curves comprising control points, comprising the steps of:

(a) selecting one of the control points on one of the curves as a current control point;

(b) calculating a first outer normal vector perpendicular to a line segment between the current control point and a previous control point, and calculating a second outer normal vector perpendicular to a line segment between the current control point and a next control point;

(c) normalizing the first and second outer normal vectors to the unit length of one pixel;

(d) decomposing the first and second normalized outer normal vectors into horizontal and vertical components;

(e) multiplying the horizontal components of the first and second normalized outer normal vectors by a horizontal displacement to obtain displaced horizontal components, and multiplying the vertical components of the first and second normalized outer normal vectors by a vertical displacement to obtain displaced vertical components;

(f) adding the displaced horizontal and vertical components of the first normalized outer normal vector to obtain a previous displacement vector and adding the displaced horizontal and vertical components of the second normalized outer normal vector to obtain a next displacement vector;

(g) translating the previous control point by the previous displacement vector to obtain a previous displacement point, and displacing the current control point by the previous displacement vector to obtain a first candidate point;

(h) translating the next control point by the next displacement vector to obtain a next displacement point, and displacing the current control point by the next displacement vector to obtain a second candidate point;

(i) intersecting a line segment between the previous displacement point and the first candidate point with a line segment between the next displacement point and the second candidate point to locate an emboldened point;

(j) performing a boundary check to determine if the emboldened point is greater than a predetermined distance from the current point;

(k) in response to determining that the emboldened point is greater than a predetermined distance from the current point, adjusting the location of the emboldened point so that it is equal to the predetermined distance; and (l) repeating steps (a)–(k) for each of the remaining control points.

8. A computer-readable medium on which is stored a computer program for emboldening a scalable outline font defined by curves comprising control points which, the computer program comprising instructions, which when executed by a computer, perform the steps of:

(a) selecting one of the control points on one of the curve as a current control point;

(b) locating a vector perpendicular to the curve passing through the current control point;

(c) moving the current control point a predetermined distance from the curve along the vector to locate an emboldened point for the current control point;

(d) repeating steps (a)–(c) for each of the remaining control points; wherein steps (b) and (c) include:
  (1) calculating a first outer normal vector perpendicular to a line segment between the current control point and a previous control point, and calculating a second outer normal vector perpendicular to a line segment between the current control point and a next control point;
  (2) normalizing the first and second outer normal vectors to the unit length of one pixel;
  (3) decomposing the fist and second normalized outer normal vectors into horizontal and vertical components;
  (4) multiplying the horizontal components of the first and second normalized outer normal vectors by a horizontal displacement to obtain displaced horizontal components, and multiplying the vertical components of the first and second normalized outer normal vectors by a vertical displacement to obtain displaced vertical components;
  (5) adding the displaced horizontal and vertical components of the first normalized outer normal vector to obtain a previous displacement vector and adding the displaced horizontal and vertical components of the second normalized outer normal vector to obtain a next displacement vector;
  (6) translating the previous control point by the previous displacement vector to locate a previous displacement point, and displacing the current control point by the previous displacement vector to locate a first candidate point;
  (7) translating the next control point by the next displacement vector to locate a next displacement point, and displacing the current control point by the next displacement vector to locate a second candidate point; and
  (8) intersecting a line segment between the previous displacement point and the first candidate point with a line segment between the next displacement point and the second candidate point to locate an emboldened point for the current control point.

9. A computer-readable medium on which is stored a computer program for emboldening a scalable outline font defined by curves comprising control points, the computer program comprising instructions, which when executed by a computer, perform the steps of:
  selecting one of the control points on one of the curves as a current control point;
  calculating a first outer normal vector perpendicular to a line segment between the current control point and a previous control point, and calculating a second outer normal vector perpendicular to a line segment between the current control point and a next control point;
  normalizing the first and second outer normal vectors to the unit length of one pixel;
  decomposing the first and second normalized outer normal vectors into horizontal and vertical components;
  multiplying the horizontal components of the first and second normalized outer normal vectors by a horizontal displacement to obtain displaced horizontal components, and multiplying the vertical components of the first and second normalized outer normal vectors by a vertical displacement to obtain displaced vertical components;
  adding the displaced horizontal and vertical components of the first normalized outer normal vector to obtain a previous displacement vector and adding the displaced horizontal and vertical components of the second normalized outer normal vector to obtain a next displacement vector;
  translating the previous control point by the previous displacement vector to obtain a previous displacement point, and displacing the current control point by the previous displacement vector to obtain a first candidate point;
  translating the next control point by the next displacement vector to obtain a next displacement point, and displacing the current control point by the next displacement vector to obtain a second candidate point;
  intersecting a line segment between the previous displacement point and the first candidate point with a line segment between the next displacement point and the second candidate point to locate an emboldened point;
  performing a boundary check to determine if the emboldened point is greater than a predetermined distance from the current point;
  in response to determining that the emboldened point is greater than a predetermined distance from the current point, adjusting the location of the emboldened point so that it is equal to the predetermined distance;
  selecting the next control point as the current control point; and
  repeating from the calculating step for each of the remaining control points.

10. A computer system for emboldening a scalable outline font defined by curves comprising control points, comprising:
  a processor;
  a memory storage device coupled to the processor for maintaining the outline font; and
  the processor being operative to conduct the following tasks:
    (a) select one of the control points on one of the curves as a current control point;
    (b) locate a vector perpendicular to the curve passing through the current control point;
    (c) move the current control point to a predetermined distance from the curve along the vector to locate an emboldened point for the current control point;
    (d) save the location of the emboldened point in the memory;
    (e) conduct tasks (a)–(d) for each of the remaining control points; where steps (b) and (c) include
      (1) calculating a first outer normal vector perpendicular to a line segment between the current control point and a previous control point, and calculating a second outer normal vector perpendicular to a line segment between the current control point and a next control point;
      (2) normalizing the first and second outer normal vectors to the unit length of one pixel;
      (3) decomposing the first and second normalized outer normal vectors into horizontal and vertical components;
      (4) multiplying the horizontal components of the first and second normalized outer normal vectors by a horizontal displacement to obtain displaced horizontal components, and multiplying the vertical components of the first and second normalized outer normal vectors by a vertical displacement to obtain displaced vertical components;

(5) adding the displaced horizontal and vertical components of the first normalized outer normal vector to obtain a previous displacement vector and adding the displaced horizontal and vertical components of the second normalized outer normal vector to obtain a next displacement vector;

(6) translating the previous control point by the previous displacement vector to locate a previous displacement point and displacing the current control point by the previous displacement vector to locate a first candidate point;

(7) translating the next control point by the next displacement vector to locate a next displacement point, and displacing the current control point by the next displacement vector to locate a second candidate point; and (8) intersecting a line segment between the previous displacement point and the first candidate point with a line segment between the next displacement point and the second point to locate an emboldened point.

\* \* \* \* \*

UNITED STATES PATENT AND TRADEMARK OFFICE
CERTIFICATE OF CORRECTION

PATENT NO. : 6,498,608 B1
DATED : December 24, 2002
INVENTOR(S) : Dresevic et al.

It is certified that error appears in the above-identified patent and that said Letters Patent is hereby corrected as shown below:

Column 2,
Line 48, "to, the" should read -- to the --.

Column 8,
Line 43, "ay" should read -- may --.

Column 9,
Line 31, "elected" should read -- selected --.

Signed and Sealed this

Ninth Day of December, 2003

JAMES E. ROGAN
*Director of the United States Patent and Trademark Office*